INVENTOR
DONALD ALLEN JONES
BY Young & Thompson
ATTYS.

United States Patent Office 3,433,375
Patented Mar. 18, 1969

3,433,375
APPARATUS FOR REMOVING ARTICLES FROM CONTAINERS BY SUCTION
Donald Allen Jones, Ashburton, Victoria, Australia, assignor to Thermo Radiant Ovens Pty. Ltd., Springvale, Victoria, Australia
Filed June 19, 1967, Ser. No. 647,156
Claims priority, application Australia, June 23, 1966, 7,373/66
U.S. Cl. 214—309        14 Claims
Int. Cl. B65g 37/00, 47/57

ABSTRACT OF THE DISCLOSURE

The invention relates to vacuum depanning apparatus, for bread loaves and other articles, of the kind having a suction chamber arranged longitudinally above a main conveyor and a further or upper conveyor at the bottom of the suction chamber which diverges upwardly and rearwardly from the main conveyor. According to the invention, the suction chamber is preferably of convergent-divergent shape in vertical cross-section and has a substantially unobstructed elongated inlet opening at its lower end and the upper conveyor comprises spaced conveyor members arranged on opposite sides of the inlet opening. The invention also provides a suction fan assembly for withdrawing air from the top of the suction chamber and side conveyors for positively moving suspended articles beyond the rear end of the inlet opening.

---

Figure 1:
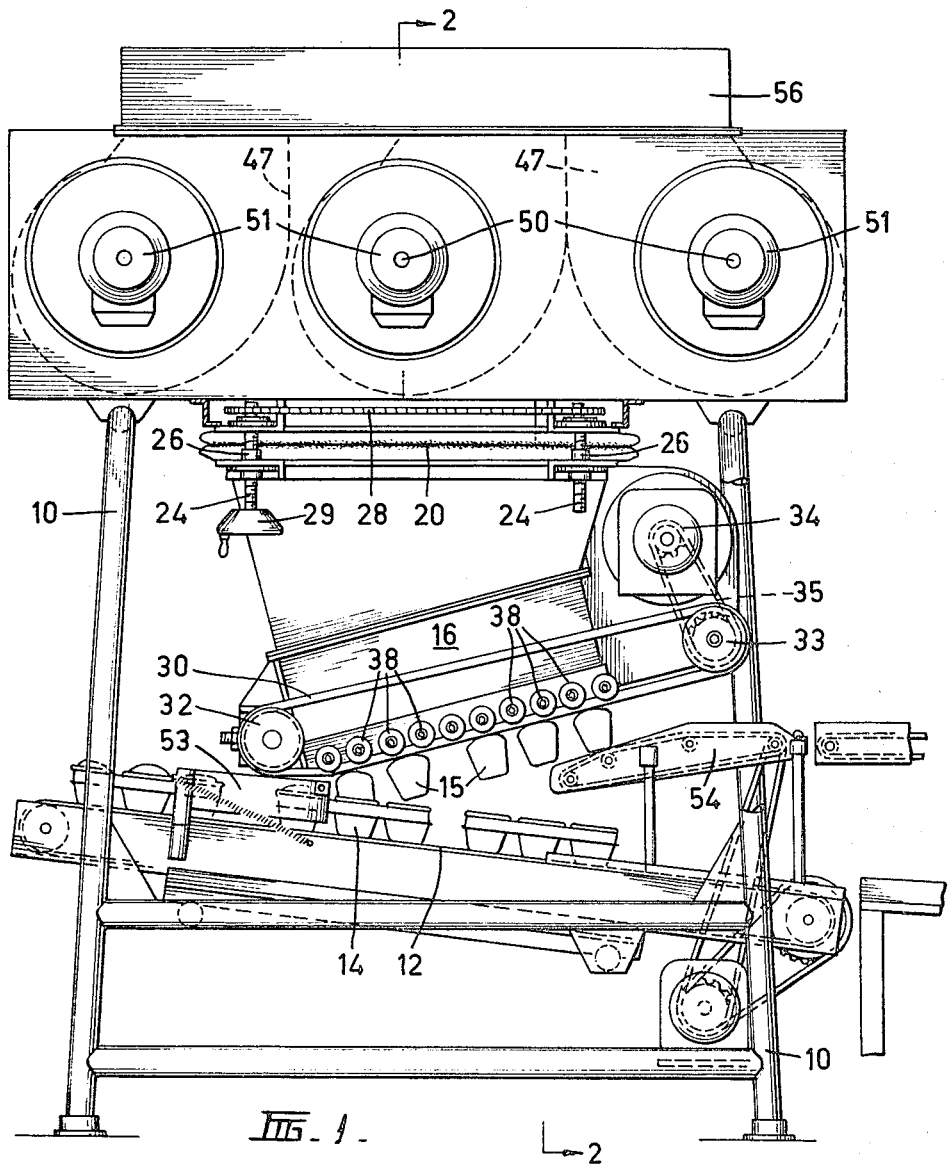

This invention relates to apparatus hereinafter termed vacuum depanning apparatus, for removing articles from containers by suction and refers particularly to the removal of bread and other baked products from baking pans.

More particularly, the invention relates to improvements in vacuum depanning apparatus of the known type in which containers carrying articles to be removed therefrom are carried in succession on a conveyor below a suction chamber, the bottom of which diverges in the direction of travel from said conveyor. As the successive articles pass below the leading end portion of the suction chamber, they are raised and retained by suction to the underside of a further or upper conveyor arranged longitudinally above the first mentioned or lower conveyor, whereby the articles are progressively withdrawn upwardly from their respective containers as they move in unison through the apparatus.

The object of this invention is to provide improvements in apparatus of the aforesaid type, one particular object being to provide improvements in the suction chamber and upper conveyor while another particular object is to provide an improved suction fan assembly for withdrawing air from the suction chamber.

Accordingly, the invention provides vacuum depanning apparatus comprising a vacuum chamber having an elongated substantially unobstructed inlet opening at its lower end, and spaced upper conveyor means arranged on opposite sides of said air inlet opening.

The invention also provides a vacuum depanning apparatus comprising an elongated suction chamber, an inlet opening in the bottom thereof, said suction chamber when viewed in transverse vertical section being of convergent-divergent, or venturi form providing an intermediate constriction or throat, and upper conveyor means adjacent the bottom of said suction chamber for longitudinally moving articles maintained by suction in contact therewith.

The said constriction or throat is preferably disposed near the lower end of said suction chamber and said inlet opening is preferably of relatively long and narrow rectangular shape while the upwardly convergent entry portion thereof, below the throat, is preferably of bell-mouth shape when viewed in sectional end elevation.

The invention further provides a suction fan assembly for vacuum depanning apparatus including a suction chamber, and comprising at least two approximately coaxial centrifugal fans arranged transversely above the suction chamber in spaced apart relationship and wherein the space between said fans communicates with the top of the suction chamber and with an air inlet opening in the inner end of one of said fans, and a passage connecting the outlet from said last mentioned fan to an inlet opening in the inner end of the other fan.

More particularly, the said space between the fans is preferably divided by a partition into a lower compartment which communicates with the inner end of the first mentioned fan and an upper compartment which connects the discharge outlet of said first mentioned fan to the inner end of said second mentioned fan.

Preferably, a plurality of similar pairs of fans are arranged in longitudinally spaced positions above the suction chamber and said transfer passage is common thereto whereby it forms an equalising chamber for the several fans.

Figure 2:
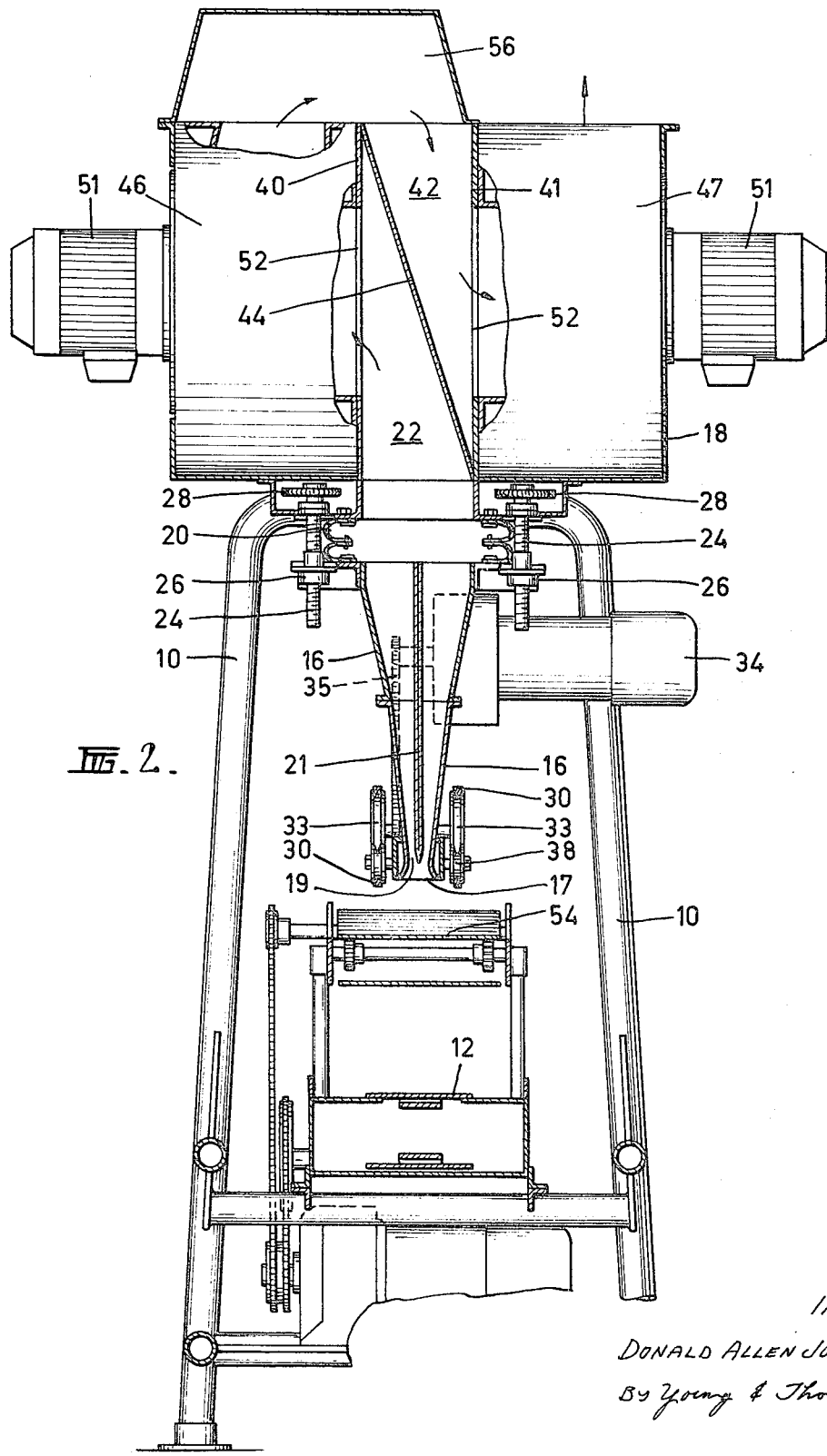
Figure 3:
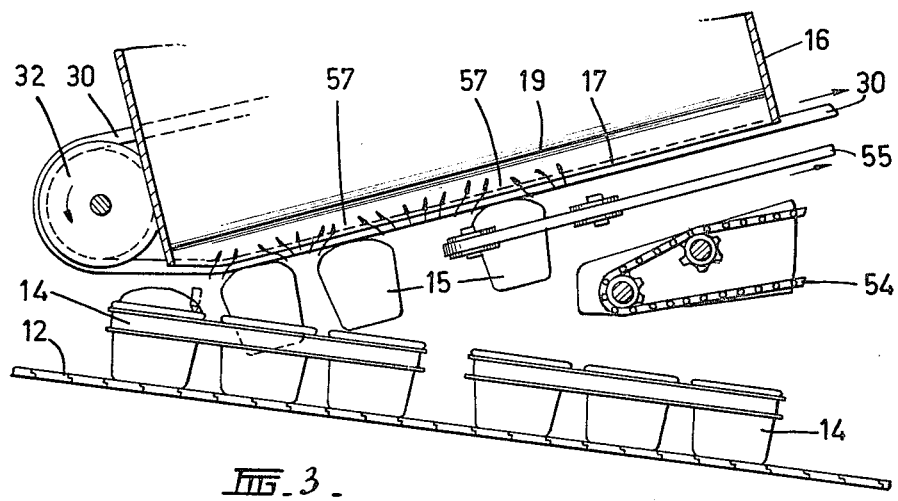
Figure 4:
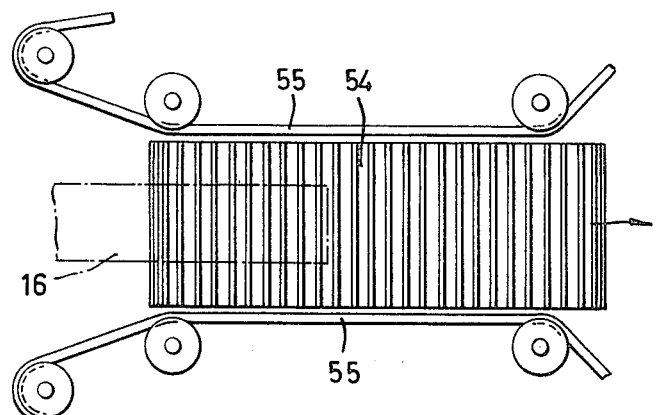

In order that the invention may be more fully understood, preferred forms thereof are described below with reference to the accompanying drawings in which:

FIGURE 1 is a view in side elevation of vacuum bread depanning apparatus according to the invention, FIGURE 2 is a view in sectional end elevation taken on the line 2—2 of FIG. 1 and is drawn to a larger scale, FIGURE 3 is a view in sectional side elevation showing the operation of the apparatus, and FIGURE 4 is a diagrammatic view in plan of side conveyor means shown in FIG. 3.

The illustrated depanning apparatus which is of the aforesaid known general type, comprises a suitable frame structure 10 which supports an endless belt conveyor 12, the upper stretch of which serves to carry baking tins or pans 14 through the machine. This pan conveyor may be disposed horizontally but preferably it inclines forwardly and downwardly towards its discharge end as shown. The said tins or pans when placed on the opposite or leading end of the conveyor each has a baked loaf 15 of bread therein.

The said tins or pans which are preferably arranged transversely on the conveyor, may be separate each from the other or alternatively they may be bound or strapped together in goups in the well known way.

A narrow elongated suction chamber 16 which is open throughout its length, both at the top and the bottom thereof, is arranged centrally above the pan conveyor 12 and lengthwise with respect thereto and when viewed from the side, its lower end or bottom inclines upwardly and rearwardly at a suitable angle towards the discharge end of the apparatus as shown, while its upper end or top may be horizontal.

The said suction chamber is suspended from the casing 18 of a suction fan assembly, by four vertically disposed screw threaded spindles 24 arranged one near each corner of the suction chamber, these spindles being rotatable so that the height of the suction chamber above the pan conveyor 12 may be adjusted to suit the size of the loaves 15. For this purpose, the upper end of each spindle is rotatively supported by the casing 18 while its screw threaded lower portion engages a corresponding nut 26 fixed to the top of the suction chamber. The several spindles are connected together by chain and sprocket gearing 28 whereby they may be turned in unison by a hand crank 29 on the projecting lower end of one of the spindles.

The open upper end of the suction chamber is connected by a suction box 20 to a longitudinally extending air inlet passage 22 formed centrally in the lower part of the fan assembly casing 18 and this suction box is preferably formed of rubber or other suitable flexible material to enable the suction chamber to be raised and lowered as already described though alternatively it may be of telescopic construction for this purpose.

The inlet opening 17 at the bottom of the suction chamber has the form of a long narrow slot which extends the full length of the chamber and is preferably uniform in width throughout its length and when viewed in vertical transverse section as in FIG. 2, this chamber is of elongated venturi shape with a bell-mouth entry portion which terminates in a constriction or throat 19 disposed only a short distance above the bottom of the chamber. Above the throat, the opposite sides of the chamber diverge more gradually upwardly to the bottom of the suction box 20.

Preferably, and as shown in FIG. 2, the suction chamber is provided with a central vertical partition 21 which enables the height of the chamber to be reduced while still providing effective diffusion.

In one construction which has given good results in use, the inlet opening 17 was four inches in width and thirty inches long though the invention is not limited to dimensions of this order.

While the invention does not exclude the provision of spaced longitudinally extending wires in, or a wire mesh or like screen across, the inlet opening 17 of the suction chamber, such a screen or the like even if it has relatively large mesh openings, interferes to some extent with the air flow and for this reason it is prefered that the inlet opening be completely unobstructed.

Two endless conveyor belts 30 (for convenience hereinafter termed the suction conveyor belts) are arranged one at each side of the lower part of the suction chamber 16 and these belts, which are preferably of V shape in cross section, pass around two pairs of co-axial pulleys 32 and 33, secured to corresponding transverse spindles mounted in bearings supported on the opposite end portions of the suction chamber.

The lower faces of the lower stretches of the belts 30 are arranged approximately in the same plane as the bottom of the suction chamber, though preferably they project slightly below that plane, and the pulleys 33 are driven by an electric motor 34 through chain and sprocket gearing 35 at a speed such that the horizontal component of the said lower stretches of the belts is approximately equal to that of the pan conveyor 12.

The said lower stretches of the suction conveyor belts are arranged close to the respective opposite sides of the inlet opening 17 of the suction chamber and the upper face of each belt is engaged by a corresponding series of closely spaced idler rollers 38 supported at the respective sides of the chamber. These idler rollers ensure that the said lower stretches of the belts 30 are not deflected upwardly by the loaves 15 of bread when the latter are pressed upwardly thereagainst due to the suction exerted thereon as hereinafter further described.

The aforesaid fan assembly casing 18 at the top of the apparatus is provided internally with two vertical partitions walls 40 and 41 which extend longitudinaly for the full length and height of the casing and are arranged at equal distances on opposite sides of the longitudinal centreline thereof. The central space between these partition walls is sub-divided into an upper inlet passage 42 and the previously mentioned lower inlet passage 22 by a diagonally disposed and longitudinally extending partition 44 which is connected at its upper end to the top of the partition wall 40 and at its lower end to the bottom of the partition wall 41. These upper and lower inlet passages are thus of triangular shape in cross section and the lower passage 22 communicates freely with the suction box 20 disposed therebelow as previously described.

The casing 18 thus contains two opposed outer chambers each of which has its outer side formed by the respective outer wall of the casing and its inner side formed by the respective internal partition 40 or 41 adjacent thereto. Each of these outer chambers accommodates one, or two or more longitudinally spaced centrifugal fans 46 or 47 arranged in transversely opposed co-axial pairs and the rotor of each fan is driven by an individual motor 51 connected to the outer end of the rotor spindle.

Each fan has a volute shaped outer casing which is closed at its outer end by the respective side wall of the casing 18 and at its inner end by the respective longitudinally extending partition wall 40 or 41 and the delivery passage of each fan extends upwardly to a corresponding discharge opening in the top of the casing 18.

An air inlet opening 52 for each fan is formed in the respective partition wall 40 or 41 so that the inlet openings for the fans 46 communicate with the aforesaid common inlet passage 22 below the diagonal partition 44 while the air inlet openings to the fans 47 similarly communicate with the common inlet passage 42 above the diagonal partition. This inlet passage 42 communicates freely with an equalising chamber 56 into which the air discharged by the several fans 46 is delivered. Thus, the two opposed groups of fans 46 and 47 are connected in series through the common equalising chamber 56 while the lower inlet passage 22 below the central diagonal partition 44 forms a pressure equalising intake chamber for the fans 46.

In operation, the suction fans 46 and 47 are operated so that atmospheric air is continuously drawn upwardly at a high velocity through the suction chamber 16 while the pan conveyor 12 and the two spaced conveyor belts 30 are driven at suitably related speeds.

Bread tins or pans 14 each containing a baked loaf 15 are successively placed transversely on the receiving end of the pan conveyor 12 so that they move rearwardly therewith to and below the suction chamber and the said conveyor belts 30.

The adjacent lower ends of the conveyor belts 30 are preferably arranged at such a height that they are disposed a short distance above the upper surfaces of the loaves 15 as the latter move rearwardly below it towards the suction zone below the chamber 16 where they are subjected to the suction effect produced by the high velocity flow of air into inlet opening 17 as shown in FIG. 3.

At or about this time, each loaf is freed from adhesion to its respective baking tin, e.g. by directing blasts of compressed air downwardly between the loaf and the opposite ends of the tin 14 in the known manner. For this purpose, discharge nozzles (not shown) may be mounted on spaced guide members 53 arranged at the opposite sides of the pan conveyor 12. The pressure of accumulated air below the loaf thus assists the suction effect in raising the loaf from the tin and into engagement with the upper conveyor belts 30 following which the loaf is retained thereto by suction and so is moved rearwardly and upwardly by them.

As the horizontal component of the speed of the upper conveyor belts 30 is approximately the same as that of the pan conveyor 12, each loaf is progressively withdrawn vertically upwards from its baking tin as it moves towards the rear end of the apparatus.

The rear ends of the suction conveyor belts 30 extend beyond the rear end of the suction chamber 16 and as each loaf moves beyond the latter, it drops from the said belts onto the receiving end of a further endless conveyor belt 54, conveniently termed, the bread take-out conveyor, which is arranged at a suitable intermediate position above the pan conveyor 12 and below the suction conveyor belts 30. The empty baking tins 14 which remain on the pan conveyor 12 pass below the bread take-out conveyor and are also discharged at the rear of the apparatus.

In order to ensure that the uniform movement and spacing of the loaves 15 is maintained as they pass rearwardly beyond the end of the suction chamber 16 where the suction opposes such movement, spaced side conveyors 55, each comprising an endless belt as shown in FIGS. 3 and 4, may if required, be arranged to engage the opposite ends of each loaf above the take-out conveyor 54 whereby the loaf is positively moved beyond the suction chamber.

It has been found experimentally that if a bread depanning machine of the aforesaid general type and in which the bread is arranged transversely to the line of travel, has a non-constricted suction chamber with a wide and long air inlet slot in the bottom thereof, it is difficult to move the bread beyond the discharge end of the slot, even with the aid of side conveyors as 55, when air is withdrawn from the chamber by a low pressure/high volume fan system. This is because the high velocity flow of air into the inlet slot tends to prevent the movement of the bread beyond the slot, notwithstanding the forward movement of conveyors such as 30 and 55. Also, the power consumption is high.

If on the other hand, higher pressures are used, and the width of the inlet slot is reduced so that the power consumption is not excessive, the suction effect is inadequate.

These results have been found to be due to the almost total loss of velocity head when the air inlet opening at the bottom of the suction chamber has the form of a slotted plate so that in these circumstances, the suction effect is substantially limited to the static suction pressure drop available at the fan.

When, however, the herein described venturi type suction chamber 16 is used, the loss of head is very substantially reduced. Thus, in one series of tests with the present invention, a static pressure reduction of the order of 43 inches, water gauge, was maintained at the venturi throat 19 by a fan system with an inlet suction of 14 inches w.g.

When, as shown, the spaced loaves of bread 15 are arranged transversely below the suction chamber 16, the streams of air which flow into the latter between the loaves diverge or spread laterally above the latter so that the upward flow within the chamber becomes substantially uniform over the area thereof. However, when the venturi passage has a sufficiently narrow throat 19 disposed closed to the inlet opening 17, the upward velocity increases, despite the expanding flow of air as it emerges from the gaps between the loaves, and in such circumstances the boundary layer conditions are fairly stable and the consequent accelerating flow results in the formation of very low pressure zones 57 above the loaves and extending into the venturi throat 19.

The provision of a suction conveyor comprising two spaced belts as 30 arranged on opposite sides of an unobstructed suction opening also provides increased aerodynamic efficiency as compared with porous belts and other similar conveyors previously known, while the described suction fan assembly is simple and convenient and maintains substantially uniform pressure conditions within the venturi passage with moderate power consumption and without excessive fan tip speeds and the accompanying high noise level.

What is claimed is:

1. Vacuum depanning apparatus comprising lower conveyor means for successively moving articles rearwardly therethrough, a vacuum chamber of narrow elongated form arranged longitudinally above and spaced from said lower conveyor means, said vacuum chamber having an inlet opening at its lower end and a discharge opening at its upper end being of convergent—divergent or venturi form when viewed in vertical section whereby it has an intermediate constriction or throat, and upper conveyor means adjacent the lower end of said vacuum chamber, thereby to convey rearwardly articles maintained by suction therewith, and wherein the lower end of the vacuum chamber and said upper conveyor means diverge rearwardly and upwardly from said lower conveyor means.

2. Vacuum depanning apparatus comprising lower conveyor means for moving containers rearwardly therethrough, a vacuum chamber arranged longitudinally above and spaced from said lower conveyor means, said vacuum chamber having an inlet opening at its lower end and a discharge opening at its upper end, upper conveyor means arranged adjacent the bottom of the vacuum chamber, said upper conveyor means being operable to convey rearwardly articles maintain by suction in contact therewith, said upper conveyor means diverging rearwardly and upwardly from said lower conveyor means, and a suction fan assembly arranged above said suction chamber, said suction fan assembly comprising at least two approximately co-axial centrifugal fans arranged transversely with respect to said vacuum chamber and in spaced apart relationship with the space therebetween communicating with discharge opening of the suction chamber and with an air inlet opening in the inner end of one of said fans, and a passage connecting the discharge outlet of the lastmentioned fan to an inlet opening in the inner end of the other fan whereby said fans are connected in series.

3. Vacuum depanning apparatus according to claim 1 wherein said throat of the vacuum chamber is disposed close to the inlet opening.

4. Vacuum depanning apparatus according to claim 3 wherein said vacuum chamber has a longitudinally extending vertical partition disposed centrally therein.

5. Vacuum depanning apparatus according to claim 1 including means operable to raise and lower the vacuum chamber relatively to said lower conveyor means.

6. Vacuum depanning apparatus according to claim 1 wherein said spaced upper conveyor means comprise longitudinally extending endless belts which extend forwardly beyond the forward end of the suction chamber and rearwardly beyond the rear end thereof, and means supporting said endless belts on the suction chamber.

7. Vacuum depanning apparatus according to claim 1 including a longitudinally extending take-out conveyor having its forward portion arranged below the rear portion of said upper conveyor means thereby to receive and convey rearwardly the said articles as they drop from said upper conveyor means as they pass beyond the rear end of the vacuum chamber, and wherein said take-out conveyor is arranged at such a height above said lower conveyor means that containers on the latter may pass therebelow.

8. Vacuum depanning apparatus according to claim 7 including spaced longitudinally extending side conveyor means disposed above the level of said take-out conveyor in positions such as to engage the opposite sides or ends of said articles as they approach the rear end of the suction chamber and positively move them beyond said rear end thereof.

9. Vacuum depanning apparatus according to claim 1 including a suction fan assembly arranged above and spaced from said suction chamber, means adjustably suspending said suction chamber from said assembly whereby said suction chamber may be raised and lowered relatively to said lower conveyor means, and means connecting the discharge opening at the upper end of the vacuum chamber to an inlet passage in said suction fan assembly.

10. Vacuum depanning apparatus according to claim 9 wherein said means connecting the discharge opening of the suction chamber to said inlet passage in the suction fan assembly is formed of rubber or other suitable flexible material.

11. Vacuum depanning apparatus according to claim 9 wherein said suction fan assembly comprises a generally rectangular longitudinally extending casing, spaced longitudinally extending vertical partitions arranged in spaced relation adjacent to the longitudinal centreline of said casing, a plurality of longitudinally spaced centrifugal fans arranged within the casing and outwardly of each of said partitions therein, each of said fans being arranged approximately co-axially with a corresponding fan at the opposite side of said partitions, each of said partitions being formed with a plurality of longitudinally spaced inlet openings each of which connects the central space between the partitions to the inner end of a corresponding fan disposed outwardly thereof, partition means subdividing said central space into a lower inlet passage and an upper inlet passage, said lower inlet passage communicating with the discharge opening in the upper end of the suction chamber, said inlet openings in one of said spaced vertical partitions being arranged in said lower inlet passage and said inlet openings in the other vertical partition being arranged in said upper inlet passage, and means forming a common passage connecting said upper inlet passage to the discharge outlets of those fans which have their inlet openings communicating with said lower inlet passage.

12. Vacuum depanning apparatus according to claim 11 wherein the discharge outlet of each of said fans is arranged at the top of said casing.

13. Vacuum depanning apparatus according to claim 7 including spaced endless belts forming side conveyors adapted to engage the opposite sides or ends of the articles as they approach the rear end of the vacuum chamber thereby to move said articles beyond the latter, said side conveyors being arranged above the level of said take-out conveyor and below the level of said spaced upper conveyors.

14. Vacuum depanning apparatus according to claim 2 including at least one further and similar pair of substantially co-axially arranged centrifugal fans disposed parallel to the two firstmentioned fans and spaced therefrom in longitudinal direction of the vacuum chamber, and wherein said passage which connects the discharge outlet of one of the firstmentioned fans to the other fan is common to the two pairs of fans.

References Cited

UNITED STATES PATENTS 2,975,920   3/1961   Reed et al. _____ 214—309
3,099,360   7/1963   Petersen et al. _____ 214—309

HUGO O. SCHULZ, *Primary Examiner.*

U.S. Cl. X.R.

198—179